Nov. 15, 1938.     R. C. BRADLEY     2,137,013
REGISTER WITH PRESET TRIP MECHANISM
Filed June 16, 1934     2 Sheets-Sheet 1
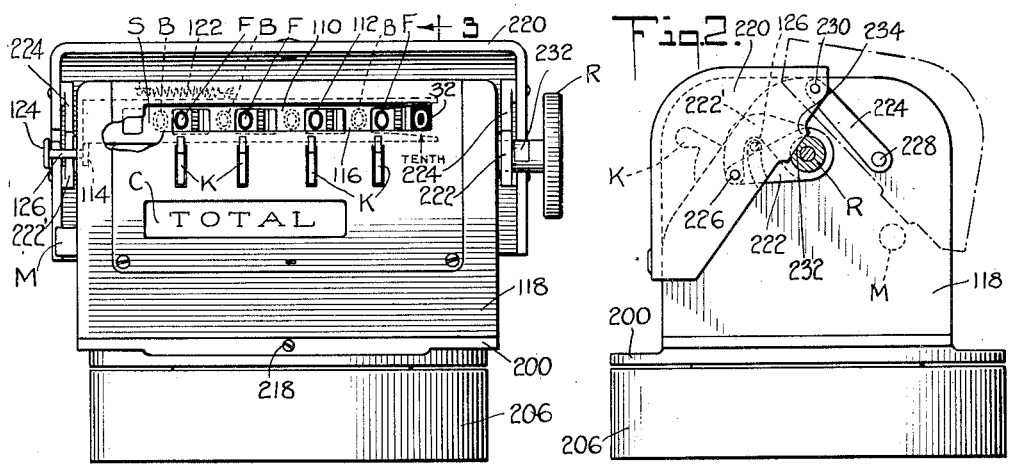
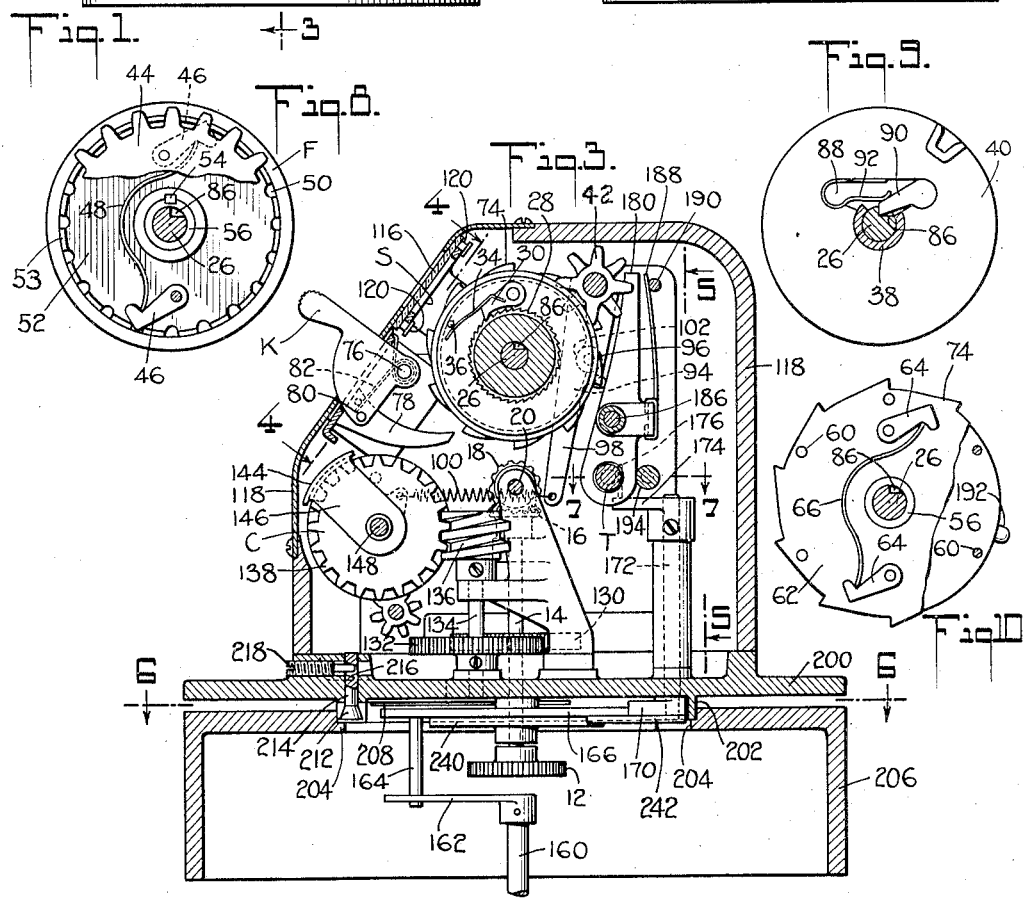
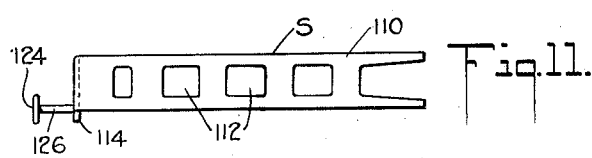
INVENTOR
Richard C. Bradley
BY
James & Franklin
ATTORNEYS Nov. 15, 1938.   R. C. BRADLEY   2,137,013
REGISTER WITH PRESET TRIP MECHANISM
Filed June 16, 1934   2 Sheets-Sheet 2
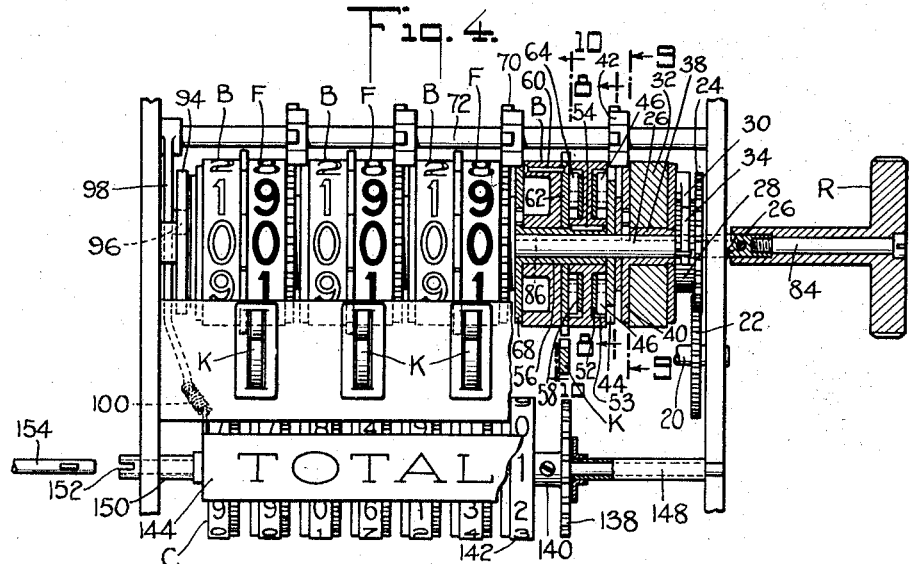
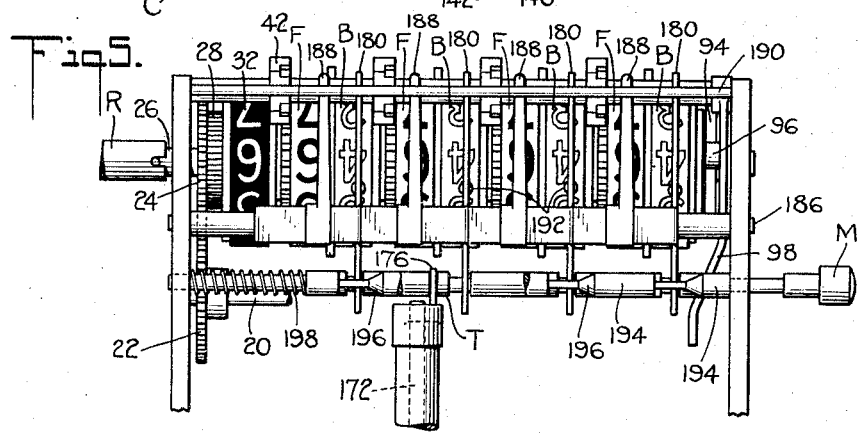
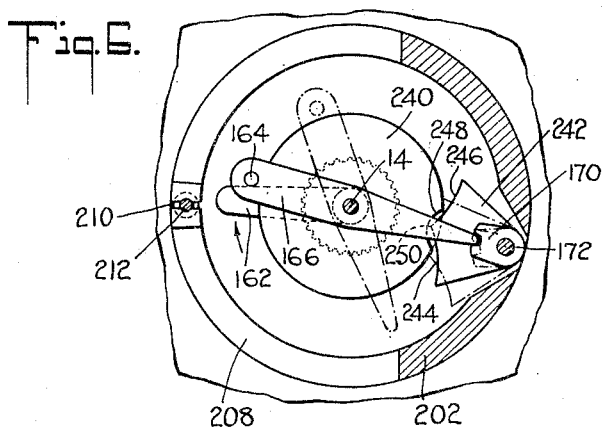
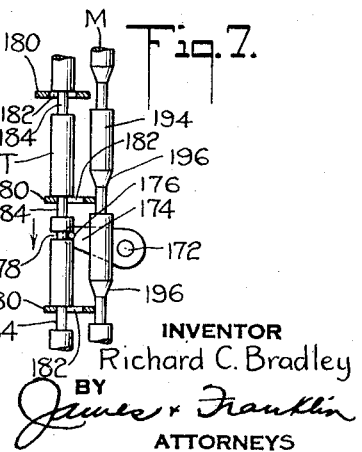
INVENTOR
Richard C. Bradley
BY
James & Franklin
ATTORNEYS Patented Nov. 15, 1938

2,137,013

UNITED STATES PATENT OFFICE 2,137,013

REGISTER WITH PRESET TRIP MECHANISM

Richard C. Bradley, Brooklyn, N. Y., assignor, by direct and mesne assignments, to Reconstruction Finance Corporation, New York, N. Y., a corporation of the United States Application June 16, 1934, Serial No. 730,864

11 Claims. (Cl. 235—132)

This invention relates to registers, and more particularly to registers provided with presettable trip or stop mechanism.

It has heretofore been suggested to provide a register with backward reading or backward numbered wheels (that is, wheels so numbered relative to the direction of rotation as to move from 9 to 8 to 7, etc., instead of from 1 to 2 to 3, etc.), which wheels may be preset to a desired quantity to be delivered through a meter driving the register. The preset wheels run backwardly to zero, and, if desired, automatically trip a valve in the delivery pipe. At the same time, a forward reading register may be used to shown the actual reading of the run, this register being provided with means to reset the same to zero for the next run. Such a register is disclosed, for example, in my prior application Serial No. 699,120, filed November 22, 1933.

The object of the present invention is to provide a generally improved register having presettable trip or stop mechanism. More particular objects of my invention are to provide such a register which will be compact in arrangement, simplified in mechanism, and arranged with convenient preset and reset controls. Still another object of my invention is to devise a register of this class in which the preset trip reading will automatically repeat itself when the counter is restored to zero for the next run. This feature is of great value when using the register to control the delivery of a series of uniform quantities, as when filling a series of barrels, or the like.

To a large extent, the foregoing objects are fulfilled in my new register by pairing each of the coaxially arranged wheels of a direct reading counter with a backward reading wheel normally moved by the forward reading wheel. The wheels may be distinguished in color, as by providing the forward reading wheels with black numbers, and the backward reading wheels with red numbers. Another object of my invention is to guard further against the possibility of confusion or erroneous reading of the dual digit wheels, which I do by the provision of an axially reciprocable blind or shutter appropriately slotted to expose only the forward reading wheels or the backward reading wheels at one time.

Further objects of my invention center about the trip mechanism, and are to provide a normally frictionless trip mechanism; readily operable manual trip mechanism for emergency use; and sturdy foolproof and normally irreversible linkage mechanism interconnecting the trip mechanism and the valve controlled thereby. Another object resides in the provision of improved mechanism permitting the register head to be faced in any desired direction relative to the adapter plate or meter on which it is mounted. A still further object is to provide an improved tamper-proof cover to protect the register and to prevent undesired manipulation of the control elements.

To the accomplishment of the foregoing and such other objects as will hereinafter appear, my invention consists in the register elements and their relation one to the other, as hereinafter are more particularly described in the specification and sought to be defined in the claims. The specification is accompanied by drawings, in which:

Fig. 1 is a front elevation of a register embodying features of my invention;

Fig. 2 is a side elevation thereof;

Fig. 3 is a section through the register head taken in the plane of the line 3—3 of Fig. 1;

Fig. 4 is a partially sectioned view taken in the plane of the line 4—4 of Fig. 3;

Fig. 5 is a rear elevation of a part of the register mechanism taken in the plane of the line 5—5 of Fig. 3;

Fig. 6 is a plan view taken on line 6—6 of Fig. 3;

Fig. 7 is a detail of the trip mechanism looking in the plane of the line 7—7 of Fig. 3;

Figs. 8, 9, and 10 are sections taken through the register wheels in planes 8—8, 9—9, and 10—10, respectively, of Fig. 4; and Fig. 11 shows the shutter or blind used at the window of the meter.

Referring to the drawings and more particularly to Fig. 4, the register comprises a series of digit wheels F arranged coaxially and constituting a straight reading counter of conventional type (that is, a counter in which the numbers or digits to be read are arranged or aligned side by side for direct reading). This counter may be reset to zero for each run, by an appropriate reset knob R. The total is added on an auxiliary totalizing counter C. In accordance with my invention, each of the digit wheels F is paired with an adjacent simultaneously moved digit wheel B, but these digit wheels are preferably numbered backwardly relative to the register wheels F. While the wheels B normally move with the wheels F, they are nevertheless arranged for independent movement so that they may be preset to a desired initial reading. In the present case the wheels B are preset by individual levers or keys K. To facilitate reading the register, I provide an axially reciprocable blind or shutter S (see Figs. 1 and 11) which exposes only the wheels F or the wheels B at any one time.

The register further includes automatic trip mechanism controlled by the preset wheels B, this trip mechanism having as its main control element an axially reciprocable trip bar T. The trip mechanism may be manually released by a push button M.

Considering the mechanism in greater detail and referring first to Fig. 3, the drive from the meter is applied to a first register gear 12 fixed on vertical shaft 14 carrying at its upper extremity a mitre gear 16 meshing with a mitre gear 18 on a horizontal shaft 20. Referring now to Figs. 4 and 5, the shaft 20 carries at its outer extremity a gear 22 meshing with a gear 24 freely rotatable on wheel carrying and reset spindle 26. Gear 24 has fixed thereto a ratchet 28 which cooperates with a pawl 30 pivotally mounted on a register wheel 32 of lowest order, as is best shown in Fig. 3. In the present case the register wheels F indicate gallons, while wheel 32 indicates tenths of gallons and is accordingly made of black composition with white numerals, as is indicated on the drawings. Pawl 30 is normally urged into engagement with ratchet 28 by a leaf spring 34 bearing against a pin 36.

The hub 38 of wheel 32 is formed integrally with a stepping tooth disc 40, as is best shown in Figs. 4 and 9. The disc 40 meshes with a Geneva pinion 42 which in turn meshes with the gear 44 of the first pair of forward and backward reading wheels. The successive pairs of wheels are similar in construction, and a description of one pair will suffice for all. The gear 44 carries dogs 46 (Fig. 8) urged apart by a spring 48 into engagement with a series of notches or recesses 50 on the inside of a wheel F. The dogs are so directed that wheel F is positively moved forwardly during the operation of the register but can overrun or move past the dogs, as when resetting the counter to zero. To strengthen the composition wheel and the recesses 50 therein, I prefer to press into the wheel a metal disc 52 which is flanged outwardly at its periphery 53, the said flange being interrupted or slotted, however, to form the recesses 50. The preliminary slotting of the edges of the disc facilitates subsequent bending or flanging of the disc.

The wheel F is keyed at 54 to a tubular hub 56 which runs through the wheels B and F. The wheel B, however, is free to rotate on hub 56 and therefore may be moved relative to the wheel F. The wheels are normally moved together by appropriate dogs corresponding to those shown in Fig. 8 and best shown in Figs. 4 and 10. For this purpose the wheel F is made symmetrical and is provided with a metallic insert 58 corresponding to the insert 52 heretofore described, while wheel B is riveted by rivets 60 to a metallic disc 62 carrying dogs 64 urged apart by a spring 66 and engaging the recesses at the flanged periphery of metallic insert 58. Inasmuch as there is no resistance to movement of the wheel B, the spring pressure of the dogs 64 may be relied upon without facing the dogs for positive drive. It is therefore possible to move wheel B relative to wheel F in a direction opposite to that of movement of wheel F, and this is desirable so that when presetting wheel B it will read in the order of increasing rather than decreasing numbers.

The hub 56 is secured to or in the present case formed integrally with a stepping tooth disc 68 which in turn meshes with a Geneva pinion 70 freely rotatable on shaft 72 which is common to the series of Geneva pinions. Geneva pinion 70 meshes with the gear 44 of the next pair of digit wheels, and so on throughout the register train.

To preset the wheels B to a desired reading, I form the periphery of disc 62, heretofore referred to, with ratchet teeth 74 best shown in Figs. 3 and 10. The keys K are pivoted on a spindle 76 (Fig. 3), and each carries a finger 78 pivoted on the key at 80. Finger 78 is normally disposed out of the path of ratchet teeth 74 in order not to interfere with free rotation of the register wheels. Upon depression of the key, finger 78 engages one of ratchet teeth 74, and the parts are so dimensioned that complete depression of the key advances the ratchet one tooth, thus changing the reading of wheel B by one digit. The key is restored to initial position by a spring 82 and may be rapidly manipulated several times in succession until wheel B is preset to the desired reading. This is done for each of so many of the wheels as may be necessary to indicate the quantity to be delivered in any particular run. During this presetting of the wheels B, no change takes place in the reading of wheels F, for these cannot move backwardly, due to the action of pawls 46 which are so shaped that they jam or lock upon attempted reverse movement.

The wheels F may be reset to zero at the beginning of each run, through rotation of reset knob R. Knob R is secured by a screw 84 to the end of reset shaft 26. This shaft is grooved, as is indicated at 86 in Figs. 3 and 9. The stepping tooth disc 40 and each of stepping tooth discs 68 are cut away at 88 to receive a pawl 90 and a spring 92 normally urging the pawl into engagement with longitudinal groove 86. Pawl 90 is so directed that the wheels normally overrun freely about shaft 26, but when knob R is rotated in clockwise direction, as viewed in Fig. 9, the pawls 90 are engaged and the wheels F brought into alignment and then rotated in unison until zero reading is reached. During the resetting operation the drive gearing of the register remains stationary, the Geneva gears and pinions being interlocked, while pawl 30 accommodates overrunning movement of the tenth wheel 32.

To assist the operator in rapidly resetting the register to zero, the shaft 26 is provided at its remote end with a cam 94 (Figs. 3, 4, and 5) with which cooperates a cam follower roller 96 carried on an arm 98. The upper end of arm 98 is pivoted on Geneva pinion shaft 72, while its lower end is connected to a tension spring 100 which normally urges the follower roller 96 tightly into engagement with the cam 94. Cam 94 is generally circular but is recessed at 102, this recess corresponding to zero reading of wheels F. It will be manifest that with this arrangement the knob may be rapidly turned until zero reading is reached, at which time further movement, while not positively stopped, is so strongly arrested that there is little likelihood of running past zero.

During the resetting operation the wheels B turn with the wheels F, and this is an advantageous feature of the present register, for the preset reading of wheels B is automatically restored at the beginning of the next run. It is sometimes necessary to deliver a specified quantity many times over, as when filling a large number of barrels, and with the present register it is merely necessary to reset the counter without again presetting the trip wheels.

To avoid confusion in reading the register, I prefer to use black numbering on register wheels F, and red numbering on the preset or trip wheels B. I further employ a blind or shutter S. This shutter comprises a strip of sheet metal 110 slotted at 112 and having one end bent downwardly at 114. The shutter is positioned behind a window 116 of register case 118. Shutter S is supported during reciprocation by a plurality of guides 120, best shown in Fig. 3. The shutter is normally drawn toward the left, as viewed in Fig. 1, by a tension spring 122. In this position the wheels B are shuttered, and only the regular counter or register wheels F are exposed to view. The shutter is connected to a manually operable push button 124 through a pin 126 passing through the side wall of the register casing. It will be manifest, from inspection of Fig. 1, that by pushing button 124 to the right, the wheels F will be shuttered and the wheels B exposed. This is done while keys K are manipulated to the desired preset reading.

Reverting to Fig. 3, the totalizing counter C is also driven from gear 12 and vertical shaft 14. Shaft 14 carries a gear 130 meshing with a gear 132 on worm shaft 134 carrying a worm 136 meshing with a worm gear 138. Referring now to Fig. 4, worm gear 138 is connected through hub 140 to the lowest order digit wheel 142 of the counter C. This counter is, of course, provided with conventional Geneva mechanism for the successive digit wheels. If desired, it may be concealed by a blind or shutter 144 oscillatable on arms 146 (Fig. 3) pivoted on the spindle 148 of the counter. One arm of the shutter may be secured to a tube 150 slotted at 152 to mate with an appropriate key 154. This key may be kept in the hands of a supervisor.

The trip mechanism is normally frictionless and does not interfere with rotation of the wheels B. Referring to Figs. 3 and 6, it may be assumed that an appropriate valve is provided in the delivery pipe, which valve is normally biased by resilient means to closed position. The valve is converted by mechanism or linkage extending to and attempting to oscillate rod 160, the attempted oscillation of which is prevented, however, by means next described. The motion of rod 160 is transmitted through arm 162 bearing against a depending pin 164 carried by an arm 166 pivoted about register drive shaft 14 and restrained from movement at its opposite end by a detent 170 mounted at the lower end of a spindle 172 which carries at its upper end a crank 174 (Figs. 3 and 7) the pin 176 of which fits in a recess 178 on trip bar T. It will be manifest that the attempted movement of arm 162 is transmitted to crank 174 and trip rod T which therefore tends constantly to move in the direction of the arrow in Fig. 7.

Trip bar T is prevented from movement by a series of levers 180 apertured at 182 to receive the trip rod. The trip rod is recessed or reduced in diameter at 184 at each of the levers 180. Referring to Figs. 3 and 5, the levers 180 are pivoted on a rod 186, and each carries a leaf spring 188 bearing against a rod 190, whereby the upper ends of levers 180 are urged constantly toward trip wheels B, while the apertured lower ends are urged into eccentric relation with trip rod T, thereby preventing axial movement of the trip rod. Each of the wheels B carries a camming projection 192, best shown in Fig. 10, this projection being disposed in alignment with the adjacent lever 180 and adapted to oscillate the lever and bring the lower end thereof into concentric relation with the trip rod. The camming projections are, of course, so disposed that this movement of the trip lever takes place when the reading of the wheel is zero. It is only upon alignment of all of the wheels B at zero that the levers 180 are aligned in position to permit free oscillation of trip rod T and consequent tripping of the entire mechanism.

In case of emergency, such as overflow of a tank being filled, or disconnection of the hose, or the like, it is desirable to arrange for manual release of the trip mechanism. For this purpose I provide a manual trip rod 194 parallel to trip rod T and provided with camming surfaces 196 adapted, upon reciprocation of rod 194, as by pushing the button M, to move all of the stop levers 180 into alignment and to release trip rod T. The manual trip 194 is normally held in the inoperative position shown in Figs. 5 and 7, by a compression spring 198.

If desired, the linkage of the trip mechanism may have added thereto appropriate means to maintain the parts in desired relation at the extremes of movement. Specifically, referring to Figs. 3 and 6, the arm 166 may have added thereto a disc 240, and the detent 170 may have added thereto a segment 242 the concave edge 244 of which is adapted to mate with the periphery of disc 240 when detent 170 is in untripped position, and the concave edge 246 of which mates with the periphery of disc 240 when detent 170 is moved to the tripped position, as is indicated by the broken lines. The periphery of disc 240 is cut away at 248 to clear the apex 250 between the edges 244 and 246. It will be understood that with this construction the range of movement of detent 170 is limited regardless of how far lever 166 may be oscillated, and, further, that when lever 166 is oscillated by tripping of the mechanism, as shown by the broken lines, the detent 170 cannot accidentally move back to the untripped position unless moved by lever 166. Similarly, when detent 170 is in the untripped position, it cannot move to the tripped position without being accompanied by lever 166. In Fig. 6 the parts shown in solid lines are in an intermediate position which is never assumed except during the transition from one extreme to the other.

In order to permit the register to be faced in any desired direction, the casing 118 is mounted on a plate 200 having a circular flange 202 thereneath. Flange 202 is received in a circular seat 204 on a member 206 which may form a part of or be secured to the meter. The drive shaft 14 of the register mechanism is arranged concentrically with flange 202, and the same applies to the trip shaft 160 which is in alignment with the drive shaft 14. This concentric arrangement readily accommodates rotational adjustment of the register.

To lock the plate 200 in position after facing the same in any desired direction, I sever a large part of flange 202 from plate 200, as is indicated at 208 in Figs. 3 and 6. I further divide the thus freed portion of the flange at 210 and insert a wedge 212 adapted to expand the flange within seat 204. Referring to Fig. 3, the wedge 212 is formed at the lower part of a vertically reciprocable pin 214 the upper end of which is provided with a biased passage 216 into which a locking screw 218 may be jammed. It will be appreciated that when screw 218 is jammed in passage 216, the wedge 212 is drawn upwardly between the ends of flange 202, thereby expanding the flange and locking it against movement within seat 204.

The register so far described is complete, but for use on trucks it is desirable to make the same tamper-proof so as to prevent children from manipulating the controls during absence of the driver. For this purpose I add to the normal casing 118 an extra cover 220, best shown in Figs. 1 and 2. This cover is so shaped as to enclose the keys K. It is mounted on casing 118 by a pair of arms 222 and 224 at each side of the casing. The arm 222 is pivoted on casing 118 coaxially with reset knob R, and is pivoted on the cover 220 at the point 226. The arm 224 is pivoted on casing 118 at 228 and on cover 220 at 230. The arm 222' on one end of casing 118 is bent to clear the push button pin 126. These arms are so dimensioned and pivoted that the cover 220 may be slid rearwardly from the solid to the broken line position of Fig. 2 without substantial elevation of the cover. This is desirable where there is but little clearance above the register. No attempt is made to enclose reset knob R within cover 220, and instead the shaft of the knob is flattened at 232 and the edge of the cover 220 is provided with a mating surface 234 so that when the cover is closed, it is impossible to turn the reset knob. Inasmuch as the reset knob is always left at the zero position determined by the stop cam 94 heretofore referred to, the flattened part 232 of the knob may be correspondingly disposed. Appropriate means of any desired type is, of course, provided to lock the cover 220 in closed position.

It is believed that the mode of constructing and using my improved register with presettable trip mechanism, as well as the many advantages thereof, will be apparent from the foregoing detailed description. The register includes a forward reading counter which at any instant indicates the quantity theretofore delivered during the run, and which at the termination of the run indicates the amount delivered. This reading is not confused by the trip wheels even though the latter are advantageously intimately associated directly with the digit wheels of the register. This intimate association or pairing of the wheels results in simplification and compactness of the mechanism. It further brings about automatic repetition of the preset reading, unless purposely changed. Other features, centering about the trip mechanism, the adjustable casing, and the tamper-proof cover, probably need no review.

It will be apparent that while I have shown and described my invention in preferred form, many changes and modifications may be made in the structure disclosed, without departing from the spirit of the invention, defined in the following claims.

I claim:

1. In a register, pairs of digit wheels arranged coaxially adjacent one another, one of said wheels in each pair being numbered forwardly and the other backwardly, means for normally effecting simultaneous movement of the backward reading wheel with the forward reading wheel, appropriate means for driving the forward reading wheel, and means to move the backward reading wheel independently of the forward reading wheel to any desired value, said means comprising a series of oscillatable keys, one for each backward reading wheel, a pawl in each key, and ratchet teeth on each backward reading wheel, said pawls normally being out of the path of movement of said ratchet teeth but being moved thereagainst on actuation of the keys.

2. In a register, a plurality of pairs of digit wheels arranged coaxially, the digit wheels in each pair being disposed adjacent one another, the digits on one wheel of each pair being numbered in opposite direction to the digits on the other wheel of each pair, presetting means associated with the backward reading wheels for adjusting the same to any desired preset reading, said means comprising a series of oscillatable keys, one for each backward reading wheel, a pawl in each key, and ratchet teeth on each backward reading wheel, said pawls normally being out of the path of movement of said ratchet teeth but being moved thereagainst on actuation of the keys, means coupling the forward and backward reading wheels for rotation in unison but affording movement of the latter by the presetting means, and transfer mechanism of conventional type interconnecting the forward reading wheels.

3. In a register, a plurality of pairs of digit wheels arranged coaxially, the digit wheels in each pair being disposed adjacent one another on a single hub, the digits on one wheel of each pair being numbered in opposite direction to the digits on the other wheel of each pair, the forward reading wheels being fixed on the hubs, and the backward reading wheels being movable on the hubs, presetting means associated with each backward reading wheel for adjusting the backward reading wheels to any desired preset reading, said means comprising a series of oscillatable keys, one for each backward reading wheel, a pawl in each key, and ratchet teeth on each backward reading wheel, said pawls normally being out of the path of movement of said ratchet teeth but being moved thereagainst on actuation of the keys, means coupling the forward and backward reading wheels for rotation in unison but affording movement of the latter by the presetting means, and transfer mechanism of conventional type interconnecting the forward reading wheels.

4. In a register, a plurality of pairs of digit wheels arranged coaxially, the digit wheels in each pair being disposed adjacent one another on a single hub, the digits on one wheel of each pair being numbered in opposite direction to the digits on the other wheel of each pair, the forward reading wheels being fixed on the hubs, and the backward reading wheels being movable on the hubs, a ratchet wheel fixed to each backward reading wheel, a plurality of independently movable keys arranged with pawls for engaging the ratchets for stepping the backward reading wheels to any desired preset reading, means coupling the forward and backward reading wheels for rotation in unison but affording free overrunning movement of the latter by the keys, and Geneva mechanism of conventional type interconnecting the forward reading wheels.

5. A register comprising a plurality of co-axially arranged but axially spaced forward reading wheels with appropriate transfer mechanism interconnecting the same to provide a counter of the straight reading type, each of said forward reading wheels being paired with a coaxial adjacent backward reading wheel, means normally causing movement of each backward reading wheel together with its forward reading wheel, means for adjusting the backward reading wheels to any desired preset reading, and trip mechanism responsive to the backward reading wheels when aligned at zero reading, said trip mechanism comprising a series of levers normally spaced from the wheels by a slight clearance, and a camming bump on each wheel to move the levers when the wheels reach zero.

6. In a register with presettable trip mechanism, a plurality of presettable digit wheels, a camming bump on each of said wheels, a movable recessed trip bar, a plurality of followers engaging said trip bar and normally preventing movement thereof, said followers being arranged for engagement by the camming bumps to release the trip bar, said preset wheels being otherwise free of the followers.

7. In a register with presettable trip mechanism, a plurality of presettable digit wheels, a camming bump on each of said wheels, a longitudinally reciprocable transversely recessed trip bar, a plurality of levers engaging said trip bar and normally urged into locking engagement with the recesses, said levers being disposed for movement by the camming bumps to release the trip bar when the preset wheels and camming bumps are aligned, said preset wheels being free of the levers for the remaining time.

8. In a register with presettable trip mechanism, a plurality of presettable backward reading digit wheels, a camming bump on each of said wheels, a longitudinally reciprocable transversely recessed trip bar, a plurality of levers engaging said trip bar and normally urged into locking engagement with the recesses, said levers being disposed clear of the wheels but sufficiently close thereto for movement by the camming bumps to release the trip bar when the preset wheels and camming bumps are aligned, and a manually operable means for releasing the trip bar.

9. In a register with presettable trip mechanism, a plurality of forward reading digit wheels, a plurality of presettable backward reading digit wheels, means to preset the same to a desired reading, a camming bump on each of said backward reading wheels, a longitudinally reciprocable transversely recessed trip bar, a plurality of levers engaging said trip bar and normally urged into locking engagement with the recesses, said levers being disposed for movement by the camming bumps to release the trip bar when the preset wheels and camming bumps are aligned, said preset wheels being free of the levers for the remaining time.

10. Trip mechanism comprising a disc normally urged in one direction, a Geneva segment detent engaging said disc, a trip bar associated with register mechanism and normally preventing movement of said detent, said disc and Geneva segment interlocking to prevent movement of the detent without accompanying movement of the disc.

11. Trip mechanism comprising a pivoted trip arm normally urged in one direction, a pivoted detent engaging said arm, a trip bar associated with register mechanism and normally preventing movement of said detent, a disc associated with said trip arm, and a Geneva segment associated with said detent, said disc and Geneva segment interlocking to prevent movement of the detent without accompanying movement of the trip arm.

RICHARD C. BRADLEY.